United States Patent
Phan et al.

(10) Patent No.: US 9,688,578 B2
(45) Date of Patent: Jun. 27, 2017

(54) SEALANT MATERIAL FOR SUBTERRANEAN WELLS

(71) Applicant: Wellcem AS, Trondheim (NO)

(72) Inventors: Xuyen Kim Phan, Sola (NO); Minli Xie, Sandnes (NO)

(73) Assignee: Wellcem AS, Trondheim (NO)

( * ) Notice: Subject to any disclaimer, the term of this patent is extended or adjusted under 35 U.S.C. 154(b) by 0 days.

(21) Appl. No.: 15/101,517

(22) PCT Filed: Dec. 3, 2014

(86) PCT No.: PCT/NO2014/050224
§ 371 (c)(1),
(2) Date: Jun. 3, 2016

(87) PCT Pub. No.: WO2015/084180
PCT Pub. Date: Jun. 11, 2015

(65) Prior Publication Data
US 2016/0304398 A1    Oct. 20, 2016

(30) Foreign Application Priority Data
Dec. 4, 2013  (NO) .................... 20131607

(51) Int. Cl.
*E21B 33/13* (2006.01)
*C04B 28/02* (2006.01)
*C09K 8/508* (2006.01)
*C09K 8/467* (2006.01)
*C04B 28/04* (2006.01)
(Continued)

(52) U.S. Cl.
CPC .............. *C04B 28/02* (2013.01); *C04B 24/00* (2013.01); *C04B 24/008* (2013.01); *C04B 24/121* (2013.01); *C04B 24/18* (2013.01); *C04B 28/04* (2013.01); *C04B 28/14* (2013.01); *C09K 8/467* (2013.01); *C09K 8/508* (2013.01); *E21B 21/003* (2013.01); *E21B 33/138* (2013.01)

(58) Field of Classification Search
None
See application file for complete search history.

(56) References Cited

U.S. PATENT DOCUMENTS 3,234,154 A    2/1966 Martin
3,437,619 A    4/1969 Nutt
(Continued)

FOREIGN PATENT DOCUMENTS

CN    105505372    *    4/2016    ............... C09K 8/80
EP    1394135        3/2004
(Continued)

OTHER PUBLICATIONS

Petrowiki "Cement composition and classification" retrieved Jan. 30, 2017 from http://petrowiki.org/Cement_composition_and_classification.*

(Continued)

Primary Examiner — Angela M DiTrani
(74) Attorney, Agent, or Firm — Andrus Intellectual Property Law, LLP

(57) ABSTRACT

A method is for sealing hydrocarbon wells, wherein a composition is used. The composition comprises a prepolymer; a free radical initiator; a hydraulic material; a monomer and water. The composition further comprises an inhibitor.

24 Claims, 3 Drawing Sheets

(51) Int. Cl.
*C04B 24/00* (2006.01)
*C04B 24/12* (2006.01)
*C04B 24/18* (2006.01)
*C04B 28/14* (2006.01)
*E21B 21/00* (2006.01)
*E21B 33/138* (2006.01)

(56) References Cited

U.S. PATENT DOCUMENTS

| | | | | |
|---|---|---|---|---|
| 3,821,985 | A * | 7/1974 | George | C09K 8/46 |
| | | | | 166/293 |
| 3,994,852 | A | 11/1976 | Adams et al. | |
| 4,455,171 | A * | 6/1984 | Spensley | C04B 28/06 |
| | | | | 106/694 |
| 5,099,922 | A | 3/1992 | Ganguli | |
| 6,082,456 | A | 7/2000 | Dahl-Jorgensen et al. | |
| 2007/0224362 | A1 * | 9/2007 | Briand | C04B 28/04 |
| | | | | 427/427.4 |
| 2007/0287639 | A1 | 12/2007 | Reddy et al. | |
| 2008/0017377 | A1 * | 1/2008 | Cowan | C04B 28/02 |
| | | | | 166/292 |
| 2012/0315417 | A1 * | 12/2012 | Pfeil | C04B 24/128 |
| | | | | 428/35.2 |
| 2013/0261220 | A1 | 10/2013 | Murphy | |
| 2014/0290954 | A1 * | 10/2014 | Mettath | C09K 8/5755 |
| | | | | 166/305.1 |

FOREIGN PATENT DOCUMENTS

| | | |
|---|---|---|
| JP | H02286781 | 11/1990 |
| NO | 310941 | 6/1994 |
| WO | 94/12445 | 6/1994 |

OTHER PUBLICATIONS

Norwegian Search Report, Patent Application No. 20131607, date of mailing Jul. 4, 2014.
International Search Report, PCT/NO2014/050224, date of mailing Nov. 3, 2015.
PCT Written Opinion, PCT/NO2014/050224, date of mailing Nov. 3, 2015.
International Preliminary Report on Patentability, PCT/NO2014/050224, date of mailing Sep. 28, 2015.

* cited by examiner

SEALANT MATERIAL FOR SUBTERRANEAN WELLS

CROSS-REFERENCE TO RELATED APPLICATIONS

This application is the U.S. national stage application of International Application PCT/NO2014/050224, filed Dec. 3, 2014, which international application was published on Jun. 11, 2015, as International Publication WO 2015/084180 in the English language. The international application is incorporated herein by reference, in entirety. The international application claims priority to Norwegian Patent Application No. 20131607, filed Dec. 4, 2013, which is incorporated herein by reference, in entirety.

FIELD

The invention relates to a material for use in subterranean wells. More specifically the invention relates to a material for sealing hydrocarbon wells, wherein the material is comprised of a hydraulic cement and a prepolymer.

BACKGROUND

During the lifetime of oil and gas wells, situations arise where there is a need for the introduction of a material with sealing properties. Such situations include plugging and abandonment (P&A), lost circulation, and isolation of zones in the well. Plugging and abandonment operations are generally carried out in situations where the well does not produce enough hydrocarbons to be profitable, or in situations where the well has neared the end of its lifetime and is depleted of hydrocarbons. Temporary plugging of wells is typically carried out during maintenance operations of the well. Lost circulation describes the situation where drilling fluid is lost in the formation and flows into the formation instead of returning through the annulus and to the surface. Zonal isolation is carried out to prevent the cross-flow of fluids between geological layers and to reduce the volume of produced water.

In the prior art, cement is commonly used as a sealant material. The disadvantages connected to the use of ordinary cement is long setting time, insufficient mechanical properties for certain applications, poor penetration capability in formations, susceptibility to cracking, and poor resistance towards certain chemicals, in particular acids. There is a need in the art for a material that can improve the properties of ordinary cement for the purposes mentioned herein.

The applicant has previously patented a technology (U.S. Pat. No. 6,082,456, NO310941B1) that seeks to overcome many of the disadvantages exhibited by the use of cement as a sealant material in oil and gas wells. The material described in the patents comprises a prepolymer, at least one vinylic monomer, an initiator, an inhibitor and optionally, a filler, hereafter described as "the prepolymer mixture". The prepolymer is in the form of at least a partially unsaturated polyester or epoxy vinylester. The material described in the referred patents is particularly advantageous compared to cement with respect to its short setting time.

SUMMARY

The invention seeks to provide a new material with sealant properties for the use in oil and gas wells. It has been discovered that the prepolymer mixture claimed in the applicants patent combined with ordinary cement, surprisingly yields a material with several beneficial properties compared to the use of cement alone. When the prepolymer mixture was blended with fresh cement, it was found that the material resulting from the combination exhibited one or more the following properties:

Controllable and shorter setting time compared to ordinary cement.

Better mechanical properties of the material compared to ordinary cement (higher compressive and tensile strength, better elongation properties, and lower Young's modulus).

Beneficial properties obtained even at a low ratio of polymer/cement (10 weight % polymer or less), wherein the polymer acts as a plasticity enhancing additive for cement.

Enhanced thermal resistance compared to the neat polymer.

Increased chemical resistance of cement. The polymer acts as a barrier towards chemical exposure of the cement.

After curing, the material possesses much lower permeability relative to ordinary cement.

Japanese patent application JPH02286781 describes an agent for preventing loss of circulating drilling mud. The agent is comprised of a thermosetting resin and, a hydraulic silicate material and emulsifier. The hydraulic silicate material can for example comprise Portland cement. The disadvantage of the described agent is the lack of control over setting time.

The invention has for its object to remedy or to reduce at least one of the drawbacks of the prior art, or at least provide a useful alternative to prior art.

The object is achieved through features which are specified in the description below and in the claims that follow.

In a first aspect the invention relates to method in accordance with claim 1.

The inhibitor of the composition used in the method can comprise p-benzoquinone.

The composition can further comprise an accelerator. The accelerator can comprise a compound, wherein the compound can be selected from the group including inorganic salts, transition metal compounds, inorganic hydroxides amides, amines and aromatic compounds. The aromatic compound can further comprise N,N-dimethyl-p-toluidine.

The prepolymer can comprise a curable material, wherein the curable material is selected from the group including unsaturated polyesters and epoxy vinyl esters.

The monomer can comprise an unsaturated compound, wherein the unsaturated compound is selected from a group including vinyl-, allyl- and acrylate compounds. The vinyl compound can be selected from the group comprising styrene and vinyl toluene. The allyl compound can comprise diallylphthalate. The acrylate compounds can be selected from the group comprising 2-hydroxy ethyl methacrylate, 2-hydroxy propyl methacrylate and butanediol dimethacrylate.

The hydraulic material can comprise a hydratable material, where the hydratable material can be selected from the group including Portland cement, Portland blastfurnace cement, Portland flyash cement, Portland pozzolan cement, Portland silica fume cement, masonry cement, pozzolan-lime cements, supersulfated cements, calcium aluminate cements, phosphate cements and geopolymer cements, and gypsum.

The water can be present in an amount of 20 to 60 weight percent of the hydraulic material.

The prepolymer can be present in an amount of 10 to 90 weight percent of the total mass of the composition.

The free radical initiator can comprise a dissociable compound, wherein the dissociable compound can be selected from the group including peroxides and azo compounds. The peroxides can be selected from the group comprising tert-Butyl cumyl peroxide and dibenzoyl peroxide.

The composition can further comprise a setting inhibitor, wherein the setting inhibitor can be selected from the group including sucrose, tartaric acid, gluconic acid δ-lactone, lignosulfonates and organic phosphonic acids. The lignosulfonate can comprise calcium lignosulfonate.

The composition can further comprise a setting accelerator, wherein the setting accelerator can be selected from the group including chloride salts, carbonates, silicates, aluminates, nitrates, nitrites, sulfates, thiosulfates and hydroxides.

The composition can further comprise a dispersing agent.

The composition can further comprise a viscosifying agent.

The composition can further comprise a stabilizing agent.

The composition can further comprise a density modifying agent. The density modifying agent can selected from the group including glass beads, trimanganese tetroxide, calcium carbonate and barite.

In a second aspect the invention relates to use of a composition for sealing hydrocarbon wells.

BRIEF DESCRIPTION OF THE DRAWINGS

In the following it is described examples of preferred embodiments illustrated in the accompanying drawings, wherein.

DETAILED DESCRIPTION OF THE DRAWINGS

It should be noted that the below-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item. The mere fact that certain measures are recited in mutually different dependent claims does not indicate that a combination of these measures cannot be used to advantage.

In the following a series of experiments are described to illustrate preferred embodiments of the invention.

Figure 1:
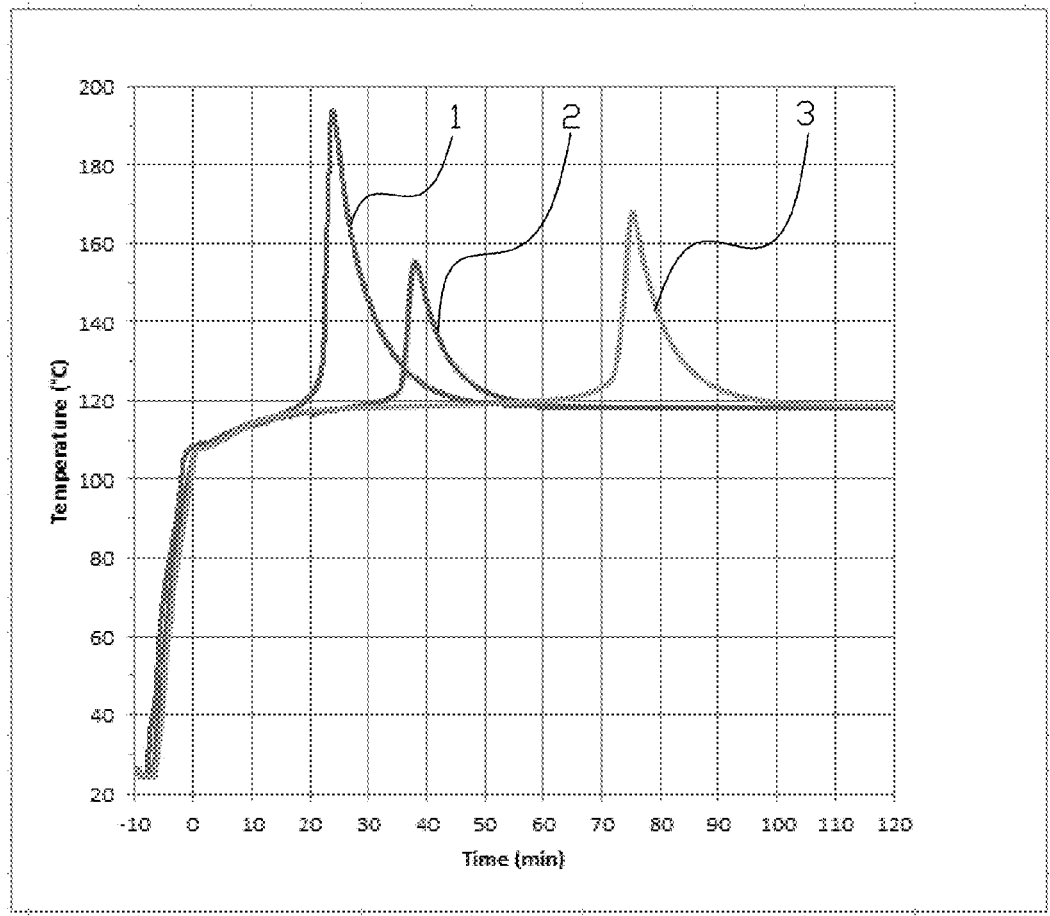
FIG. 1 shows a time vs. temperature trace of experiments 1-3.
Figure 2:
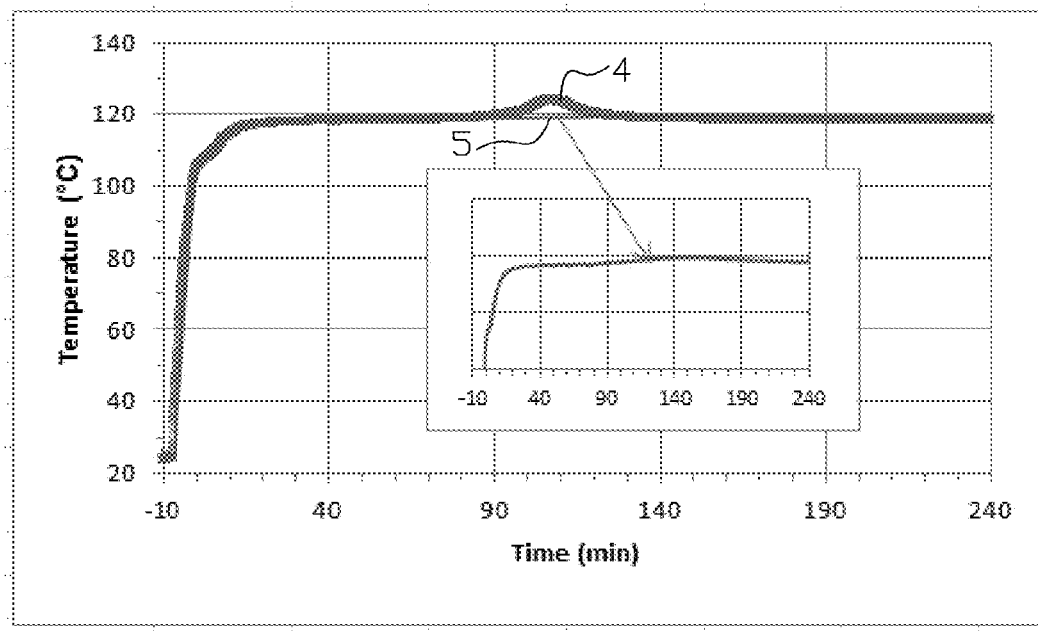
FIG. 2 shows a time vs. temperature trace of experiments 4-5.

A first series of experiments (experiment 1 to 5, see FIG. 1-2 and table 1) were carried out to examine the effect of varying amounts of radical initiator, inhibitor and a cement setting time inhibitor on the setting time and hardening time of the compositions. The radical initiator used was t-butyl cumyl peroxide, and the radical- and cement inhibitors were δ-benzoquinone and calcium lignosulfonate, respectively. The compositions were made by blending a prepolymer mixture (part A) and cement slurry (part B).

The prepolymer mixture (part A) was prepared by mixing prepolymer, radical initiator and optionally an inhibitor. The cement slurry (part B) was prepared by blending cement, water and optionally a setting time inhibitor. When part A and part B had been blended separately to achieve sufficient homogeneity, quantities of part A and part B were weighed in and part A and B were blended. The quantities of the components that were used are shown in table 1. All quantities are given in weight percent. The setting time and hardening time for each of the mixtures was recorded. The setting time was defined as the time from start of the reaction until appearance of the exothermic peak. The hardening time was defined as the time from start of the reaction until the exothermic peak returned to the baseline. In case of an unclear exothermic peak, the setting time was defined as the time from start of the reaction until the composition resisted flow by pouring.

TABLE 1

| Components | EX. 1 | EX. 2 | EX. 3 | EX. 4 | EX. 5 |
|---|---|---|---|---|---|
| Prepolymer mixture (part A): | | | | | |
| Prepolymer | 100 | 100 | 100 | 100 | 100 |
| Initiator: Tert-Butyl cumyl peroxide | 2 | 1 | 0.3 | 0.3 | 0.3 |
| Inhibitor: p-penzoquinone | — | — | — | 0.1 | 0.2 |
| Cement slurry (Part B): | | | | | |
| Cement type G | 100 | 100 | 100 | 100 | 100 |
| Water | 30 | 30 | 30 | 30 | 30 |
| Inhibitor: calcium lignosulfonate | — | — | — | 0.1 | 0.1 |
| Part A/Part B | 4/1 | 4/1 | 4/1 | 4/1 | 4/1 |
| Application Temperature (° C.) | 115 | 115 | 115 | 115 | 115 |
| Setting time (min) | 20 | 30 | 65 | 80 | 110 |
| Hardening time (min) | 50 | 70 | 110 | 120 | 240 |

It could be observed from experiment 1 through 3 that the reduction of the amount of initiator increased both the setting time and the hardening time, providing a means for controlling these parameters. Additional inclusion of an inhibitor and a cement hardening inhibitor in experiments 4-5 further increased the setting time and hardening time.

Figure 3:
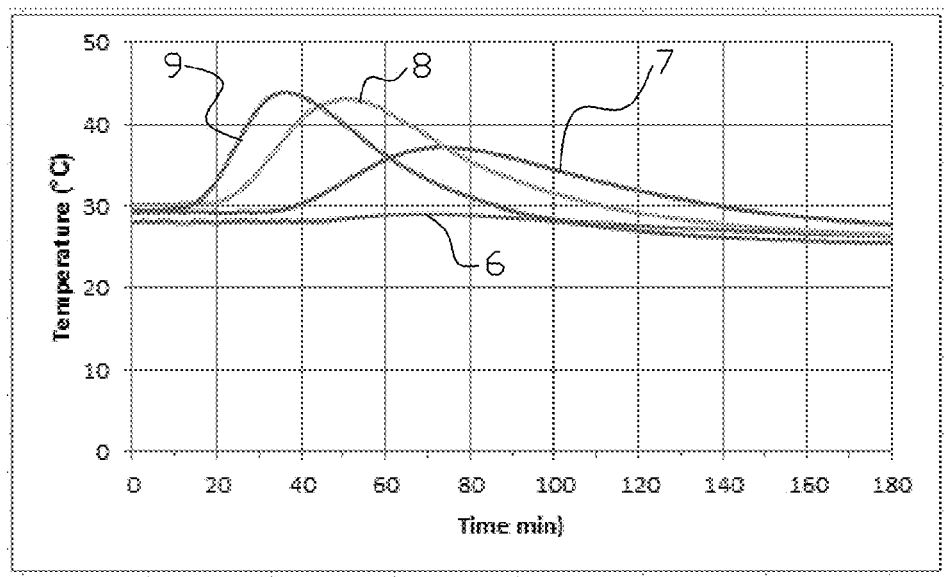
FIG. 3 shows a time vs. temperature trace of experiments 6-9.

A second series of experiments (experiment 6-9, see FIG. 3 and table 2) were carried out to examine the effect of increasing amounts of accelerator on the setting time and hardening time. The amount of radical initiator was held fixed at 3 weight percent and the cement slurry (Part B) did not contain any inhibitor. The experimental procedure concerning blending of the components was identical to the procedure described for experiments 1-5. The quantities of the components are shown in table 2. All quantities are given in weight percent.

TABLE 2

| Components | EX. 6 | EX. 7 | EX. 8 | EX. 9 |
|---|---|---|---|---|
| Prepolymer mixture (part A): | | | | |
| Prepolymer | 100 | 100 | 100 | 100 |
| Initiator: Dibenzoyl Peroxide | 3 | 3 | 3 | 3 |
| Accelerator: N,N-deimethyl-p-toluidine | — | 0.2 | 0.3 | 0.4 |
| Cement slurry (Part B) | | | | |
| Cement type G | 100 | 100 | 100 | 100 |
| Water | 30 | 30 | 30 | 30 |
| Part A/Part B (weight parts) | 1/1 | 1/1 | 1/1 | 1/1 |

TABLE 2-continued

| Components | EX. 6 | EX. 7 | EX. 8 | EX. 9 |
|---|---|---|---|---|
| Application Temperature (° C.) | 25 | 25 | 25 | 25 |
| Setting time (min) | 1 day | 35 | 20 | 10 |
| Hardening time (min) | 1 day | 180 | 140 | 100 |

It could be observed from experiment 6-9 that increasing the amount of accelerator reduced both the setting time and the hardening time, providing an additional means for controlling these parameters.

Figure 4:
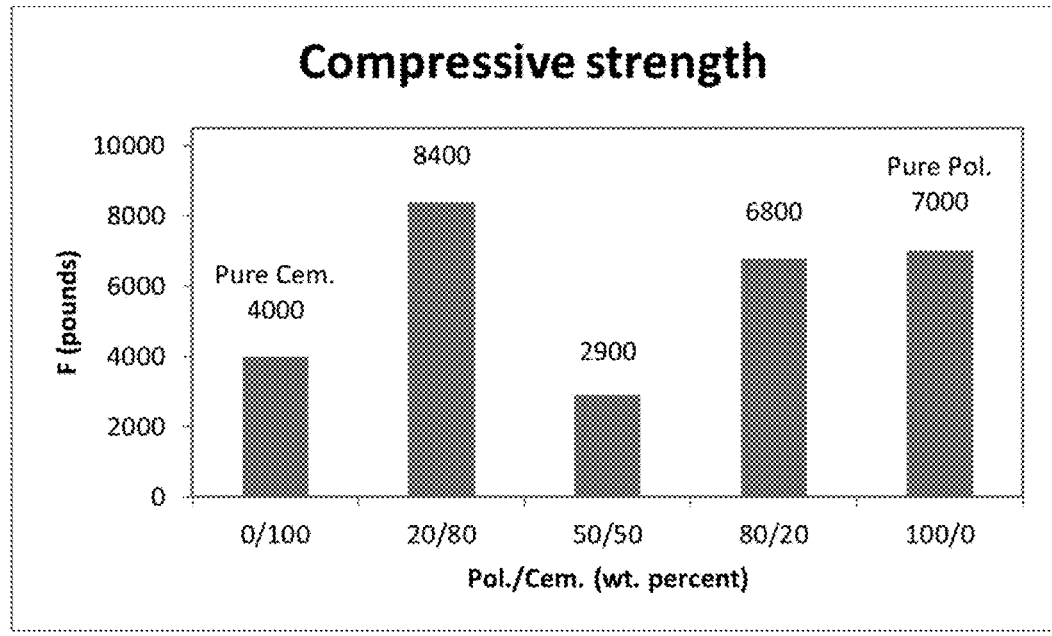
FIG. 4 shows a composition vs. compressive strength bar-graph.

A third series of experiments were carried out to determine the compressive strength of several blend ratios of prepolymer mixture and cement slurry (see FIG. 4). The various blends of prepolymer mixture and the cement slurry was blended and hardened in a container to form cylindrical test specimens of approximately 1.4 inches in diameter and 1.4 inches in length. All samples were stored for 4 weeks after preparation before measuring the compressive strength. The test specimens were subjected to pressure using a Carver press (model 3851-CE), and the forces at which the samples failed were recorded. The leftmost column in FIG. 4 shows the force at which pure, hardened cement failed (4000 lbs.). The rightmost column in FIG. 4 shows the force at which pure, hardened polymer failed (7000 lbs.). It was sought to find a ratio at which the blend of prepolymer mixture and cement slurry would show a higher compressive strength than either pure hardened cement or pure hardened prepolymer alone. Such a blend would exhibit a synergistic property in relation to the maximum attainable compressive strength. The ratio between the prepolymer mixture and cement that showed a synergistic effect was found to be a blend with a 20/80 polymer/cement ratio, which attained a compressive strength of 8400 lbs. Specimens made from ratios of 50/50 weight percent polymer/cement were found to show a lower compressive strength than either hardened prepolymer or hardened cement alone, and consequently this ratio proved to exhibit an antagonistic effect on the compressive strength.

A significant advantage is gained from the ability to increase the compressive strength of pure cement by addition of the said prepolymer mixture. At even low levels of addition of the prepolymer mixture (20/80 prepolymer/cement ratio), the compressive strength of the cement was surprisingly found to be more than doubled compared to cement alone.

Furthermore, another significant advantage related to the invention is the ability to control the setting time and the hardening time of the composition by varying the amounts of initiator, accelerator and cement inhibitor. This allows for a precise tailoring of the composition to the relevant well conditions and placement times involved.

The invention claimed is:

1. A method for sealing hydrocarbon wells, the method comprising:
Step A—injecting a composition for sealing hydrocarbon wells into a hydrocarbon well, wherein the composition comprises a prepolymer, a free radical initiator, a hydraulic material, a monomer and water and inhibitor, wherein a setting time and a hardening time of the composition are set by choosing the amounts of initiator and inhibitor for precisely tailoring of the composition to the relevant well conditions and placement times involved, and
Step B—letting the composition of step A cure in the hydrocarbon well at a temperature of 0° C. to 150° C., wherein in step A the prepolymer comprises a curable material, wherein the curable material is selected from a group consisting of unsaturated polyesters and epoxy vinyl esters, and
wherein in step A the monomer comprises an unsaturated compound, wherein the unsaturated compound is selected from a group consisting of vinyl-, allyl- and acrylate compounds,
wherein the composition is prepared by blending the prepolymer and a cement slurry comprising the hydraulic material prior to injection, and
wherein the composition comprises a weight ratio of the prepolymer to the cement slurry between 1:99 to 20:80.

2. The method according to claim 1, wherein in step A the inhibitor comprises p-benzoquinone.

3. The method according to claim 1, wherein in step A the composition further comprises an accelerator.

4. The method according to claim 3, wherein in step A the accelerator comprises a compound, wherein the compound is selected from a group consisting of inorganic salts, transition metal compounds, inorganic hydroxides, amides, amines and aromatic compounds.

5. The method according to claim 4, wherein in step A the accelerator comprises N,N-dimethyl-p-toluidine.

6. The method according to claim 1, wherein in step A the unsaturated compound is selected from a group consisting of styrene and vinyl toluene.

7. The method according to claim 1, wherein in step A the unsaturated compound comprises diallylphthalate.

8. The method according to claim 1, wherein in step A the unsaturated compound is selected from a group consisting of 2-hydroxy ethyl methacrylate, 2-hydroxy propyl methacrylate and butanediol dimethacrylate.

9. The method according to claim 1, wherein in step A the hydraulic material comprises a hydratable material selected from a group consisting of Portland cement, Portland blast-furnace cement, Portland flyash cement, Portland pozzolan cement, Portland silica fume cement, masonry cement, pozzolan-lime cements, supersulfated cements, calcium aluminate cements, phosphate cements and geopolymer cements, and gypsum.

10. The method according to claim 9, wherein in step A the hydratable material comprises Portland cement.

11. The method according to claim 1, wherein in step A the water is present in an amount of 20 to 60 weight percent of the hydraulic material.

12. The method according to claim 1, wherein in step A the prepolymer is present in an amount of 10 to 90 weight percent of the total mass of the composition.

13. The method according to claim 1, wherein in step A the free radical initiator comprises a dissociable compound, wherein the dissociable compound is selected from a group consisting of peroxides and azo compounds.

14. The method according to claim 13, wherein in step A the dissociable compound is selected from a group consisting of tert-Butyl cumyl peroxide and dibenzoyl peroxide.

15. The method according to claim 1, wherein in step A the composition further comprises a setting inhibitor, wherein the setting inhibitor is selected from a group consisting of sucrose, tartaric acid, gluconic acid δ-lactone, lignosulfonates and organic phosphonic acids.

16. The method according to claim 15, wherein in step A the setting inhibitor comprises calcium lignosulfonate.

17. The method according to claim 1, wherein in step A the composition further comprises a setting accelerator, wherein the setting accelerator is selected from a group consisting of chloride salts, carbonates, silicates, aluminates, nitrates, nitrites, sulfates, thiosulfates and hydroxides.

18. The method according to claim 1, wherein in step A the composition further comprises a dispersing agent.

19. The method according to claim 1, wherein in step A the composition further comprises a viscosifying agent.

20. The method according to claim 1, wherein in step A the composition further comprises a stabilizing agent.

21. The method according to claim 1, wherein in step A the composition further comprises a density modifying agent.

22. The method according to claim 21, wherein in step A the density modifying agent is selected from a group consisting of glass beads, trimanganese tetroxide, calcium carbonate and barite.

23. The method according to claim 1, wherein the composition is prepared by blending a prepolymer mixture, the prepolymer mixture comprising the prepolymer and the free radical initiator, and the cement slurry, the cement slurry comprising the hydraulic material and water.

24. A method for sealing hydrocarbon wells, the method comprising:

Step A—injecting a composition for sealing hydrocarbon wells into a hydrocarbon well, wherein the composition comprises a prepolymer, a free radical initiator, a hydraulic material, a monomer and water and inhibitor, wherein a setting time and a hardening time of the composition are set by choosing the amounts of initiator and inhibitor for precisely tailoring of the composition to the relevant well conditions and placement times involved, and Step B—letting the composition of step A cure in the hydrocarbon well at a temperature of 0° C. to 150° C., wherein in step A the prepolymer comprises epoxy vinyl esters, wherein in step A the monomer comprises an unsaturated compound, wherein the unsaturated compound is selected from a group consisting of vinyl-, allyl- and acrylate compounds, and wherein the composition is prepared by blending the prepolymer and hydraulic material prior to injection.

* * * * *